United States Patent
Dropps et al.

(10) Patent No.: US 9,253,120 B1
(45) Date of Patent: Feb. 2, 2016

(54) SYSTEMS AND METHODS FOR HIGH SPEED DATA PROCESSING AT A NETWORK PORT

(71) Applicant: QLOGIC, Corporation, Aliso Viejo, CA (US)

(72) Inventors: Frank R. Dropps, Maple Grove, MN (US); Bruce A. Klemin, Rocklin, CA (US); Edward C. McGlaughlin, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 210 days.

(21) Appl. No.: 14/051,290

(22) Filed: Oct. 10, 2013

(51) Int. Cl.
*G06F 13/42* (2006.01)
*H04L 12/40* (2006.01)
*H04L 12/935* (2013.01)

(52) U.S. Cl.
CPC .............. *H04L 49/30* (2013.01); *G06F 13/426* (2013.01); *G06F 13/4265* (2013.01); *H04L 12/40006* (2013.01)

(58) Field of Classification Search
None
See application file for complete search history.

(56) References Cited

U.S. PATENT DOCUMENTS

2011/0033188 A1* 2/2011 Elbers et al. ............... 398/79
2011/0135312 A1* 6/2011 El-Ahmadi et al. ........ 398/135

* cited by examiner

*Primary Examiner* — Hoon J Chung
(74) *Attorney, Agent, or Firm* — Klein, O'Neill & Singh, LLP

(57) ABSTRACT

Network device for sending and receiving information is provided. The network device includes a port having a receive segment for receiving information and a transmit segment for transmitting information. The port can be configured to operate as an independent port using a single link operating at 25 gigabits per second.

18 Claims, 8 Drawing Sheets

| Ethernet Header | FCOE Header | SOF | FC Header | Pay Load | FC CRC | EOF | Ethernet FCS |
|---|---|---|---|---|---|---|---|
| 502 | 504 | 506 | 508 | 510 | 512 | 514 | 516 |

SYSTEMS AND METHODS FOR HIGH SPEED DATA PROCESSING AT A NETWORK PORT

BACKGROUND

1. Technical Field

The embodiments disclosed herein are related to networks and network devices.

2. Related Art

Networking systems are commonly used to move network information (which may also be referred to interchangeably, as frames, packets or commands) between computing systems (for example, servers) or between computing systems and network devices (for example, storage systems). Various hardware and software components are used to implement network communication, for example, switches, adapters and other similar devices.

Network devices typically include a multi-port device where each port manages a point-to-point connection between itself and an attached system. Each port can be attached to a server, peripheral, input/output subsystem, bridge, hub, router, or another switch, where each of the aforementioned network devices also has one or more ports. Different network and storage protocols may be used to handle network information and storage information, for example, Fibre Channel, Ethernet and others. Continuous efforts are being made to improve network communication.

BRIEF DESCRIPTION OF THE DRAWINGS

The various present embodiments now will be discussed in detail with an emphasis on highlighting the advantageous features. These embodiments depict the novel and non-obvious systems and methods for packet grouping in networks shown in the accompanying drawings, which are for illustrative purposes only. These drawings include the following figures, in which like numerals indicate like parts:

FIG. 1 is a functional block diagram of a network that the present embodiments may be used in connection with;

FIG. 5 illustrates an example of a frame format used by the current embodiments.

DETAILED DESCRIPTION

Figure 1:
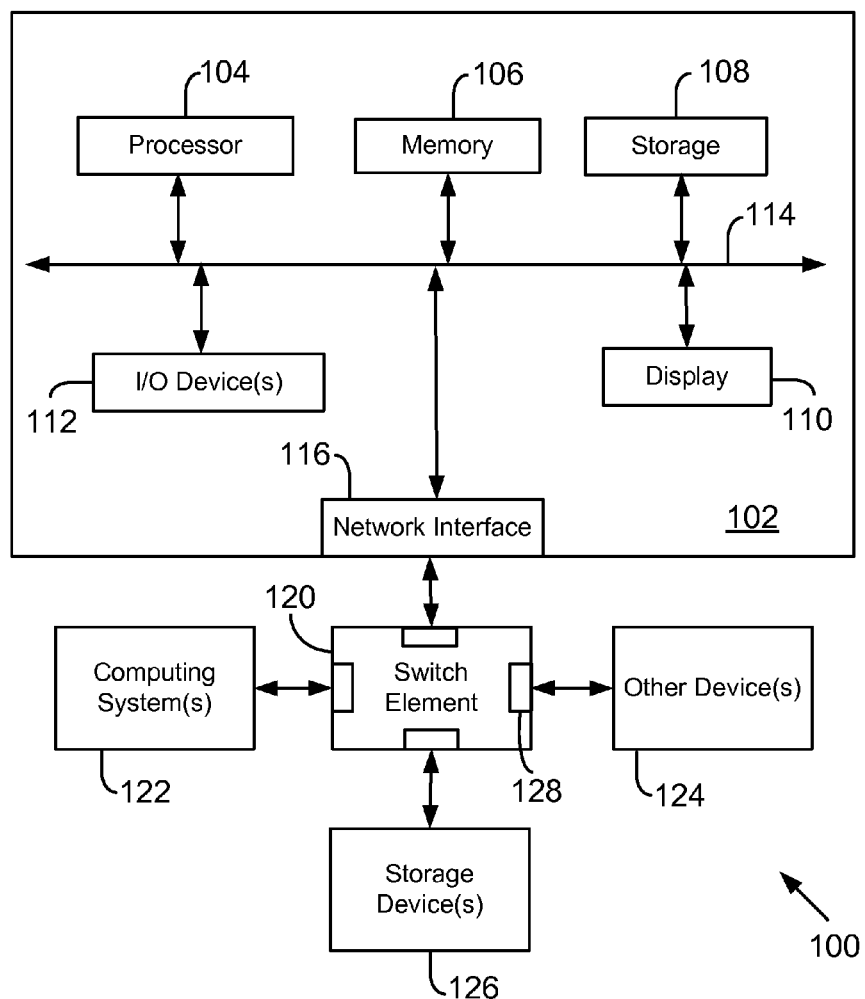

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). The embodiments disclosed herein, may be implemented as a computer process (method), a computing system, or as an article of manufacture, such as a computer program product or non-transitory, computer-readable media. The computer program product may be computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet standards (or technologies). However, these protocols are used merely for ease of reference and to provide examples. The present embodiments are not limited to Fibre Channel and Ethernet standards/technologies.

Fibre Channel (FC) is a set of American National Standards Institute (ANSI) standards. Fibre Channel technology provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks(LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use high speed Gigabit Ethernet networks (or higher speeds) while preserving the Fibre Channel protocol.

The term "link" as used herein refers to a connection between network devices and may include one or more lanes of data. The term "link rate" in gigabits per second (or "G") refers to a rate at which information is transferred between network devices across a link.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor, processors or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114.

The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various network links. The network interface 116 may comprise a network interface card (NIC) or any other device for facilitating communication between the host system 102, other computing systems 122, storage devices 126, and other devices 124. The network interface 116 may include a converged network adapter for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter or a network card.

Network interface 116 may include a processor, memory and a plurality of ports (not shown). The ports are used to receive and send information, while the processor (not shown) executes firmware instructions out of the memory (not shown).

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports 128 for receiving and transmitting information via a link operating at a link rate, for example, node ports (N_Ports), Fabric ports (F_Ports), and expansion ports (E_Ports). Node ports may be located in a node device, e.g. the network interface 116 of the host system 102 and an interface (not shown) for the storage devices 126. Fabric ports are typically located in Fabric devices, such as the switch element 120. Details regarding the switch 120 are provided below.

Figure 2A:
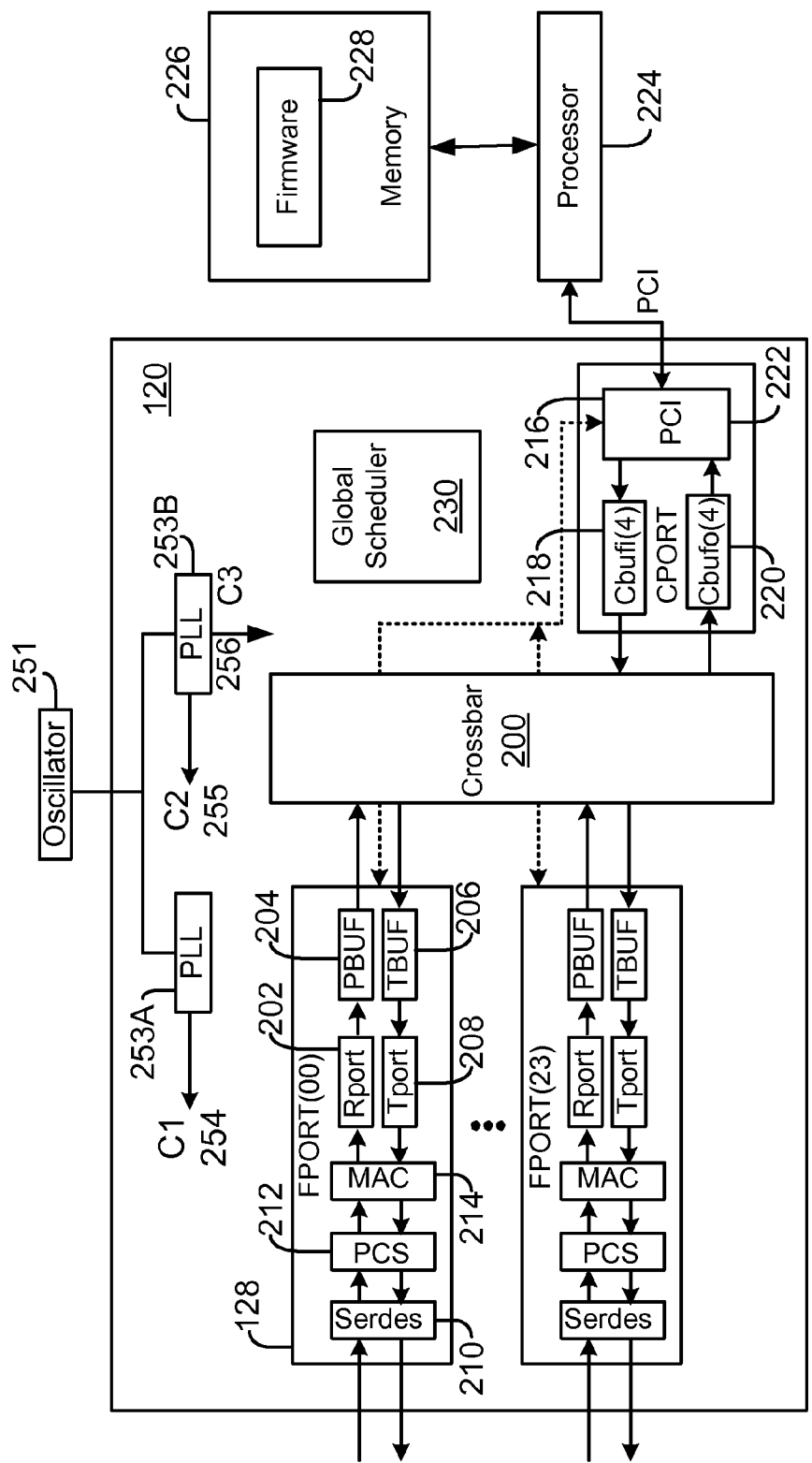
FIG. 2A is a functional block diagram of a switch element according to the present embodiments.

FIG. 2A is a high-level block diagram of switch element 120, also referred to as the switch 120. Switch element 120 may be implemented as an application specific integrated circuit (ASIC) having a plurality of ports 128. An external oscillator 251 may be used to power a plurality of phase locked loop (PLL) circuits 253A-253B to generate a plurality of clocks, C1 254, C2 255 and C3 256. As an example, C1 254 may be 425 MHz when a port is configured to operate as a Fibre Channel port, C2 255 may be 312 MHz when a port is configured to operate as an Ethernet port, and C3 256 may be a system clock of 825 MHz. The embodiments disclosed herein are not limited to any particular clock rate.

Ports 128 are generic (GL) ports and may include an N_Port, F_Port, FL_Port, E-Port, or any other port type. Ports 128 may be configured to operate as Fibre Channel, FCoE or Ethernet ports. In other words, depending upon what it is attached to, each GL port can function as any type of port. As an example, ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate ports 128 and port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202.

The RPORT 202 temporarily stores received frames at a memory storage device, shown as PBUF (pause buffer) 204. The frames are then sent to a transmit segment (or transmit port (TPORT)) 208 via the crossbar 200. The TPORT 208 includes a memory device shown as a transmit buffer (TBUF) 206. The TBUF 206 may be used to stage frames or information related to frames before being transmitted. The TPORT also includes a shared MAC and PCS or shares PCS 212 and MAC 214 of the RPORT 202. The SERDES at TPORT is used to convert parallel data into a serial stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI)218, which is used to transmit frames from the processor 224 to ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of independently, operating sub-ports, each uniquely identified for receiving and sending frames. The sub-configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, one double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Figure 2B:
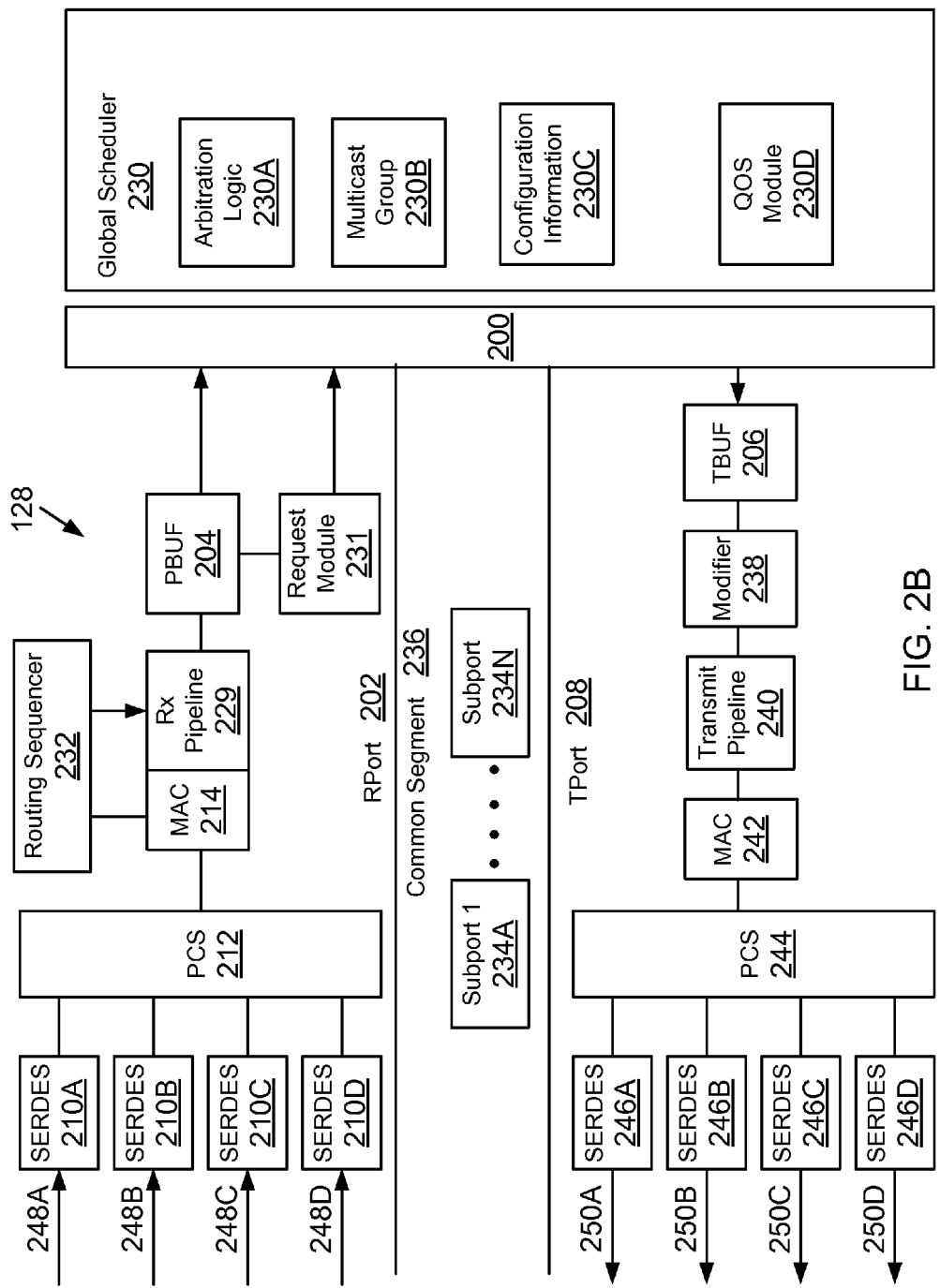
FIG. 2B is a functional block diagram of a base-port, according to one embodiment.

FIG. 2B shows an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128. In one embodiment, base-port may be configured to include a plurality of independently operating sub-ports. The configuration information/logic 234A-234N for each sub-port may be stored in common segment 236.

RPORT 202 may include or has access to a plurality of network links, for example, four independent physical network links (that may include one or more lanes and may be referred to as lanes) 248A-248D, each configured to operate as a portion of an independent sub-port within base-port 128. Each network link is coupled to a SERDES 210A-210D that share PCS 212 and MAC 214. The multiple links also share a receive pipeline 229 that is used for pre-processing received frames before they are transferred. Both MAC 214 and receive pipelines 229 are time multiplexed so that they can be shared among the plurality of links based on how the ports are configured to operate. PCS 212 and MAC 214 may be a part of the receive pipeline 229.

Incoming frames are received via one of the network links 248A-248N. The received frame is processed by the appropriate SERDES 210A-210D and then sent to the PCS 212. After PCS 212 processes the frame, the frame is provide to MAC 212 that is time shared among a plurality of sub-ports. This means that for a certain time segment (for example, clock cycles), MAC 214 may be used by one of the sub-ports. After the MAC 214 processes the frame it is sent to receive pipeline 229 that is also time shared. Information regarding the frame or a copy of the frame is also provided to a routing sequencer (or module) 232 that determines the destination of the received packets. In one embodiment, a frame whose destination is processor 224 is given the highest priority, followed by a frame that is routed by a TCAM (ternary content addressable memory) or steering registers located within a routing sequencer 232. More than one routing sequencer 232 may be used for each base-port 128.

Frames that are ready to be sent out are then staged at PBUF 204. PBUF 204 may have a plurality of queues (slots/locations) that may be referred to as receive queues. The receive queues temporarily store frames, until a request to move the frame is granted.

To move frames from the receive queues; a request module 231 generates requests for a global scheduler 230, also referred to as scheduler 230. Request module 231 maintains a data structure (not shown) that tracks a number of requests that may be pending for each sub-port. Request module 231 also removes requests from the data structure when a grant is received for a particular request.

Scheduler 230 stores configuration information 230C for various ports and some of that information may be used to select requests. Scheduler 230 also includes arbitration logic 230A that performs dual stage arbitration for processing requests from various base-ports. Scheduler 230 also maintains a data structure at a memory labeled as multicast group 230B. The data structure stores information for identifying multicast groups that may receive multicast frames, i.e. frames that are destined to multiple destinations. Scheduler 230 uses the information for processing requests that involve multicast frames. Scheduler 230 further includes a quality of service (QOS) module 230D that monitors QOS data, which is used to select requests for processing packets.

Frames for transmission via TPORT 208 move via TBUF 206 and a modifier 238. In one embodiment, modifier 238 may be used to insert, change or remove information from an outgoing frame. The modification is based on the frame type and transmit virtual queue. The time shared transmit pipeline 240 and MAC 242 are used to process outgoing frames. PCS 244, SERDES 246A-246D are used similar to PCS 212 and SERDES 210A-210D. PCS 244 and MAC 242 may be a part of transmit pipeline 240.

Network links 250A-250D are similar to links 248A-248D, except links 250A-250D are used to transmit frames. Furthermore, links 248A-248D and 250A-250D may be a part of the same physical links that can receive and transmit data. In one embodiment, there are multiple requests and grants processed simultaneously.

According to the new Ethernet standards, a 100 G (i.e. gigabits per second) link rate Ethernet connection uses 4 lanes that each operate at 25 G. However, not all applications use or need 100 G in link bandwidth for sending and receiving information. Certain applications may benefit from a port that is configured to operate at lower speeds for example, 25 G, 50 G or 75 G link rate. The IEEE Ethernet standards do not disclose the use of ports operating independently at 25 G, 50 G or 75 G link rates.

The embodiments disclosed herein allow a port to be configured to operate at the non-standard, rate of 25 G, 50 G and/or 75 G link rate. When a port is operating at 25 G link rate, one link may be used and when operating at a 50 G link rate, 2 lanes may be used. The 25 G port may use 64 b/66 b encoding at a baud rate of 25.78125 Gbs and the data bandwidth operates at 3.125 Gbytes/s. The 50 G port using 2 lanes will also use 64 B/66 b encoding and the data bandwidth will be 6.25 Gbytes/s. At 75 G, the port will use three lanes.

Forward error correction (FEC) or channel coding is a technique that is used to control errors in data transmissions over communication channels. Various techniques, include error correction code (ECC) may be used for detecting and correcting errors. FEC handling for multilane configuration and for single lane configuration is different as described below in detail with respect to FIGS. 3A-3B. The PCS configuration is also different, as described below with respect to FIGS. 4A-4B.

Figure 3A:
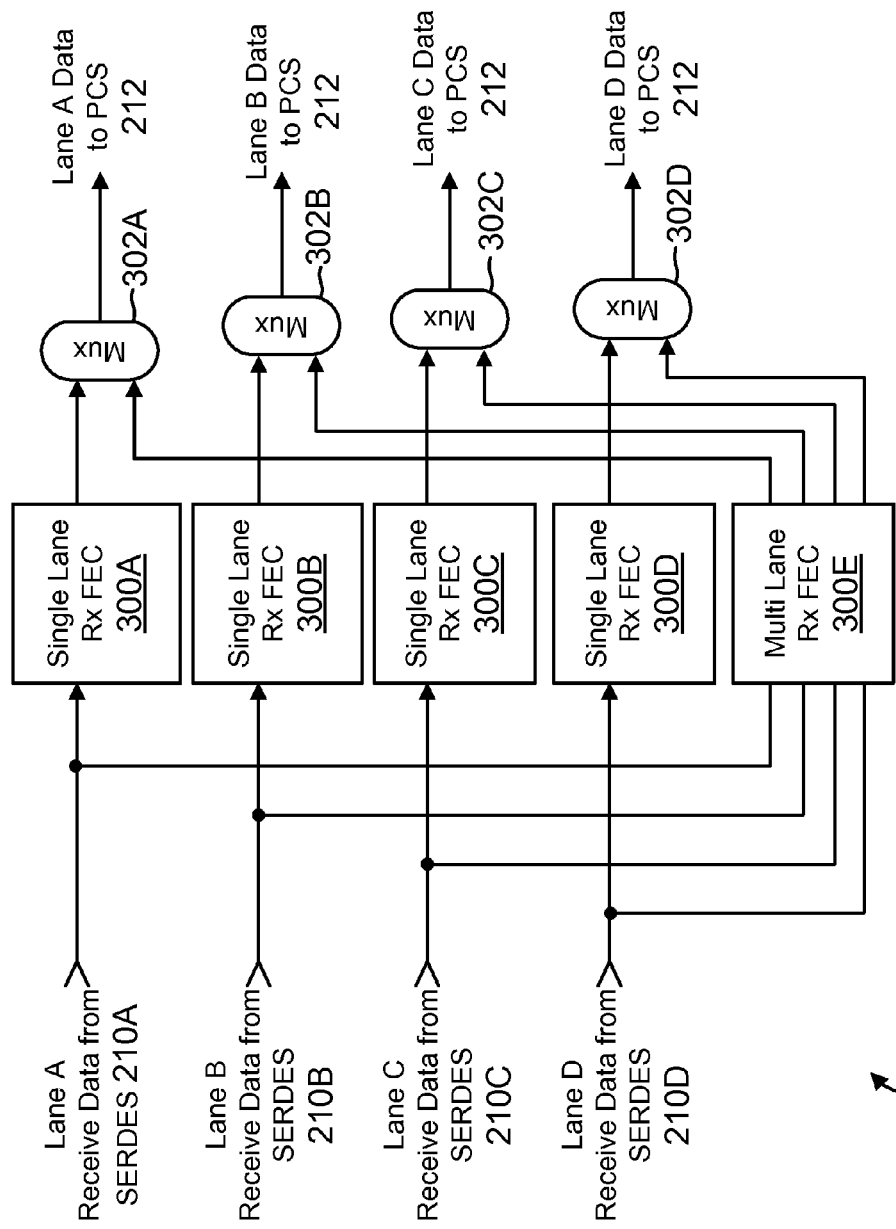
FIGS. 3A-3B show examples of configuring forward error correction code (FEC) modules, according to one embodiment.

FIG. 3A shows a configuration 301 for FEC logic on a receive side (i.e. RPORT) of a port 128 where the port can be configured to operate as a multi-lane port or as multiple single lane ports. In a multi-lane port, more than one lane is used by the port for sending and receiving information. As a single lane port, only a single lane is used by the port to receive and send information. Lanes A-D is similar to links 248A-248D (or 250A-250B for the transmit side) are referred to interchangeably.

When a port operates as a single lane link (for example, at 25 G link rate), then each lane has a dedicated FEC logic for performing forward error correction. For example, logic 300A is used for lane A, logic 300B is used for lane B, logic 300C is used for lane C and logic 300D is used for lane D.

Multi-lane logic 300E is used when more than one lane is used for a port. For example, if lane A and lane B are used for a port that is configured to operate at a 50 G link rate, then logic 300E is used for handling FEC. When lanes A, B, C and D are used for a port to operate at a 100 G link rate, then logic 300E is used for FEC. If three lanes are used for a port operating at a 75 G link rate, then logic 300E is used for FEC.

FEC 300E processes data striped across multiple lanes. For example, when multiple words are received at different lanes, then words 1 and 2 may be processed from lane A, words 3 and 4 may be processed from lane B, words 5 and 6 may be processed from lane C and words 7 and 8 may be processed from lane D. This maintains the order in which data is received at multiple lanes. In contrast, FEC 300A-300D processes all data words from the same lane. FEC 300A-300D execute the same single lane FEC algorithm on the receive data stream while FEC 300E executes a different multi-lane algorithm for data received on multiple lanes.

Figure 4A:
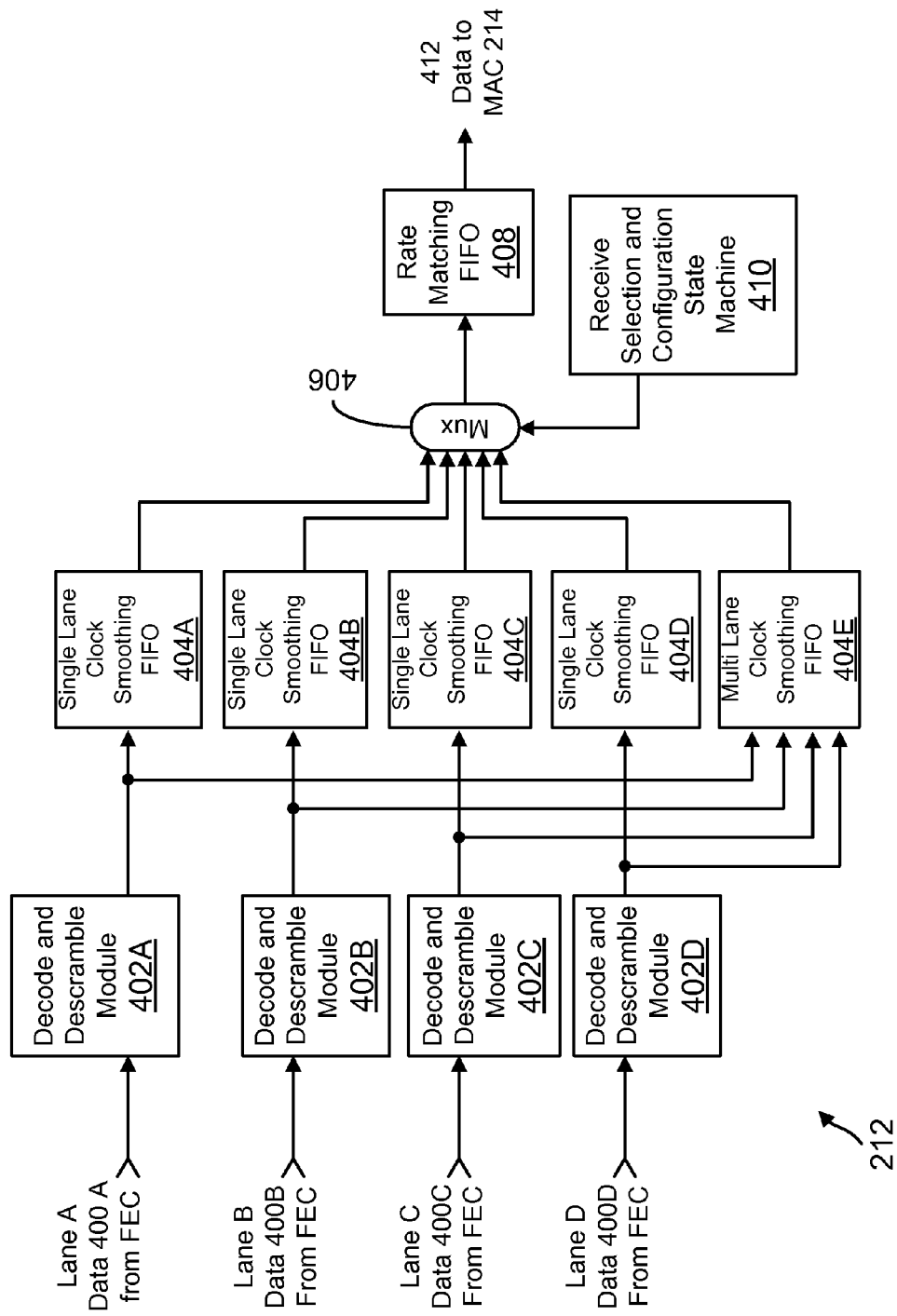
FIG. 4A-4B illustrate configuration of a PCS module, according to one embodiment.

Configuration 301 also includes a plurality of multiplexers (Mux) 302A-302D that are used to select data from FEC logic 300A-300E, respectively. Data from Muxes 302A-302D is then sent to PCS 212 that is shown in FIG. 4A and described below. The data that is selected by one of the Muxes will depend on whether the port is configured as a single lane port (for example, 25 G) or a multi-lane port (for example, 50 G).

Figure 3B:
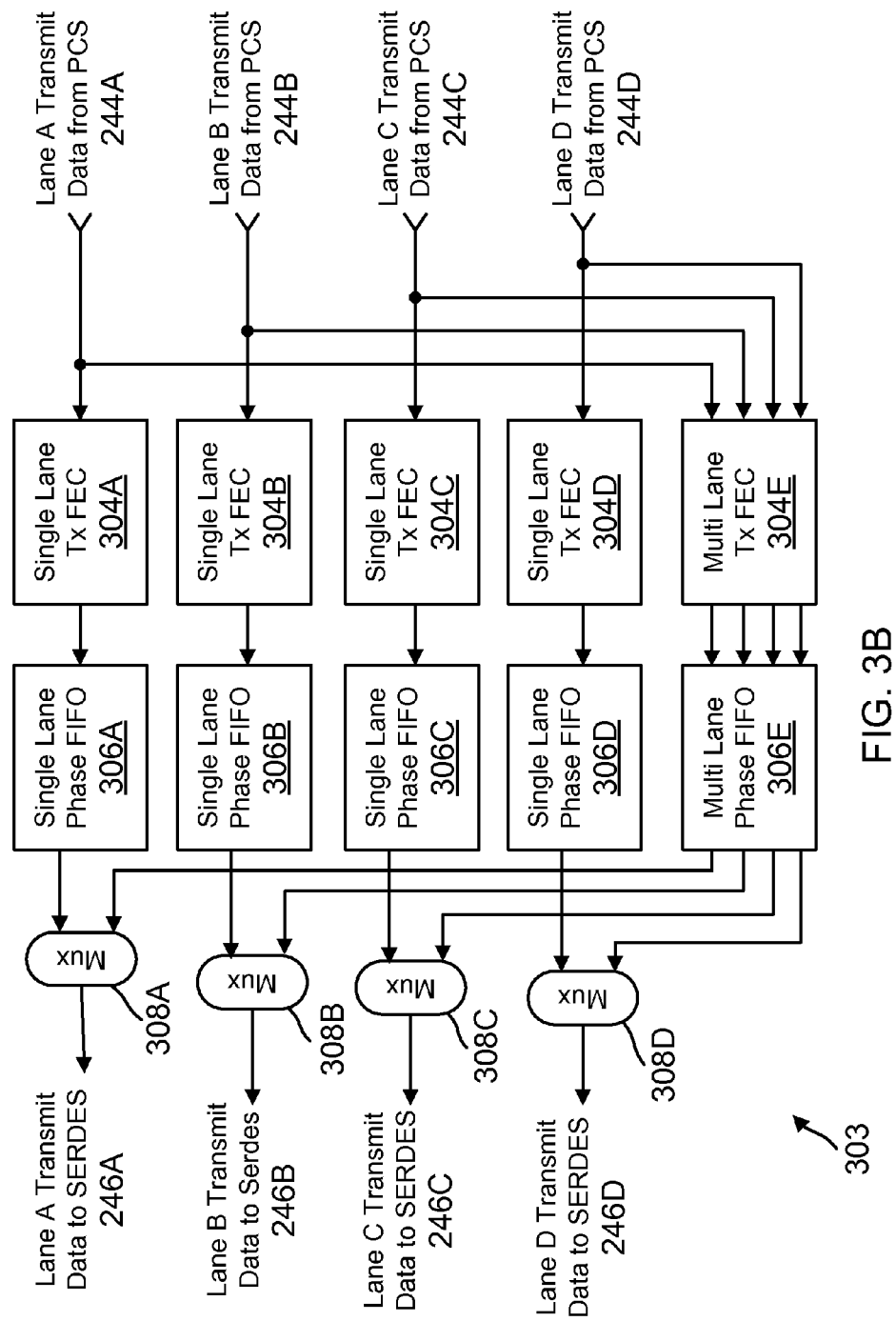

Data that is transmitted from a transmit segment (TPORT) also uses FEC. A configuration 303 for the transmit side is shown in FIG. 3B, according to one embodiment. In this configuration, similar to the receive side, each lane has a dedicated FEC logic for single lane configuration and a multi-lane FEC logic when more than one lane is used for performing FEC. For example, logic 304A is used for lane A, logic 304B is used for lane B, logic 304C is used for lane C and logic 304D is used for lane D. When multi-lanes are used, then logic 304E is used for performing FEC.

Besides individual FEC logic, the transmit side also includes a dedicated first in-first-out (FIFO) memory for each lane and a dedicated FIFO for a multi-lane configuration. The FIFOs are used to stage data before being selected by one of the Muxes 308A-308D for further processing. Data selected from Muxes 308A-308D are sent to an appropriate SERDES (246A-246D). For example, FIFO 306A is used for lane A data, FIFO 306B is used for lane B, FIFO 306C is used for lane C and FIFO 306D is used for lane D. FIFO 306E is used when more than one link is used for a port configuration.

FIG. 4A shows a block diagram of PCS 212 for the receive segment of a base-port 128, according to one embodiment. Data 400A-400D for each of lanes A-D is provided to a decode and descramble module 402A-402D (also referred to as module 402A-402D), respectively. Module 402A is for lane A to receive data 400A. Module 402B is for lane B to receive data 400B. Module 402C is for lane C to receive data 400C, while module 402D is for lane D and receives data 400D.

The decode modules convert encoded data into un-encoded data. For example a decoder module converts encoded 66 bits data to un-encoded 64 bit data. The received data is encoded by a link partner transmitter and the decoder restores the original data and checks for errors and special symbols. The descramble modules unscramble the data bits that were scrambled by the transmitter. Data scrambling is used to prevent long serial sequences of "0" or "1" values improving SERDES operation and reducing link errors.

Data from modules 402A-402D are fed into FIFOs 404A-404E. FIFOs 404A-404D are for single lane configuration, while FIFO 404E is used when a port is configured to use more than one lane. FIFO 404E is used to maintain the order in which data is received for multiple lanes.

Mux 406 is used to select data from FIFOs 404A-404E, based on the port configuration. A receive selection and configuration state machine 410 (or state machine 410) provides an input to Mux 406 to select data based on port configuration.

Data from Mux 406 is sent to a rate matching FIFO 408 that is used to match the received link data rate to the receive MAC data pipeline rate. Thereafter, data is sent to MAC 214 for further processing.

Figure 4B:
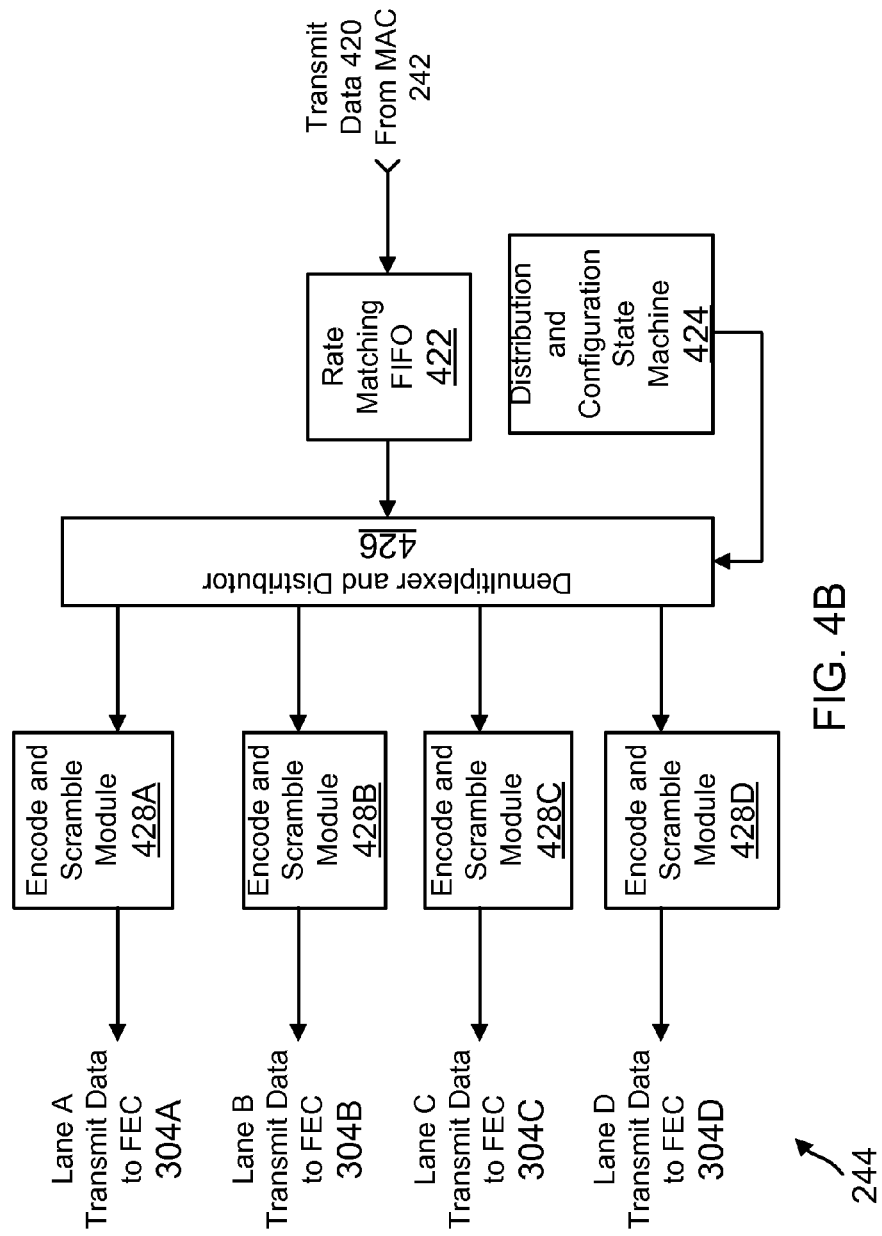

FIG. 4B shows a block diagram of PCS 244, according to one embodiment. In this example, data 420 is provided by MAC 242 to a rate matching FIFO 422 that is similar to rate matching FIFO 408. The data is then provided to a de-multiplexer and distributor 426 that distributes data to a particular encode and scramble module 428A-428D. The data is distributed based on input from a distribution state machine 424. The data is distributed based on the port configuration.

The encode and scramble modules 428A-428D encode and scramble the outgoing data for lanes A-D respectively. Data from modules 428A-428D is then provided to FEC 304A-304D, respectively, before being provided to SERDES 246A-246D for further processing.

In one embodiment, the SERDES for the receive and transmit segments may have dedicated PLL for single lane port configurations and a shared PLL for multiple lane port configurations.

The MAC 214 and 242 are also configured differently for the multiple lane and single lane configurations, described above. For example, to a check frame's CRC (cyclic redundancy code), for multiple single lane configurations, there are multiple residue values that are saved and used for computing CRC on a next packet. For the a multi-lane configuration, a single value may be used.

FIG. 5 shows an example of an FCoE packet format 500 for processing network and storage traffic, according to the present embodiments. The FCoE packet 500 includes an Ethernet header 502. In one embodiment, the Ethernet header 502, which includes the Ethernet type, may be fourteen bytes in length, for example. The Ethernet header may also include optional Tag fields (not shown). The FCoE packet 500 also includes an FCoE header 504 that includes a number of reserved fields. A start of frame (SOF) 506 indicates the beginning of the embedded Fibre Channel frame and may be one byte, for example.

The FCoE packet 500 may also include a Fibre Channel header (FC Header) 508 that may be 24 bytes long with a payload 510. The Fibre Channel cyclic redundancy code (CRC) 512 may be 4 bytes and the Fibre Channel end of frame (EOF) 514 may be 1 byte in size. The EOF 514 indicates the end of the embedded Fibre Channel frame. The Ethernet FCS 516 is inserted after the Fibre Channel EOF 514.

In one embodiment, the 25 G link rate allows for high density, high bandwidth links at a reduced cost. 25 G links are better matched to the bandwidth requirements of today's high performance cloud servers. In another embodiment, links operating at 50 G and 75 G may have the same advantages as the 25 G link rate.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the ports operating at 25 G, 50 G or 75 G link rates may be located at any network device, for example, adapters, NICs and others and are not limited to just switch element ports. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A network device for sending and receiving information, comprising:
a port having a receive segment for receiving information and a transmit segment for transmitting information using a plurality of links, where each link has a dedicated forward error correction logic for controlling errors in a first configuration, when the port operates as a first independent port using only one of the plurality of links; and a multi-lane forward error correction logic for controlling errors in a second configuration, when the same port operates as a second independent port using more than one link for sending and receiving information and the more than one link provides a combined throughput for the second configuration;
wherein in the first configuration the port operates at 25 gigabits per second using the one link and in the second configuration the port operates at a rate higher than 25 gigabits per second using more than one link.

2. The network device of claim 1, wherein the network device is a switch element having the port.

3. The network device of claim 1, wherein the port is configured to operate as an Ethernet port.

4. The network device of claim 1, wherein the port is configured to operate as a Fibre Channel over Ethernet port.

5. The network device of claim 1, wherein the network device is an adapter for sending and receiving information.

6. The network device of claim 1, wherein the port uses two links to operate at a combined rate of 50 gigabits per second.

7. The network device of claim 1, wherein the port uses three links to operate at a combined rate of 75 gigabits per second.

8. A network device for sending and receiving information, comprising:
a port having a receive segment for receiving information and a transmit segment for transmitting information using a plurality of links, where each link has a dedicated forward error correction logic for controlling errors in a first configuration, when the port operates as a first independent port using only one of the plurality of links; and a multi-lane forward error correction logic for controlling errors in a second configuration, when the same port operates as a second independent port using more than one link for sending and receiving information and the more than one link provides a combined throughput for the second configuration;
wherein in the first configuration the port operates at 25 gigabits per second using the one link and in the second configuration the port uses two links operating at a combined rate of 50 gigabits per second, or uses three links operating at a combined rate of 75 gigabits per second.

9. The network device of claim 8, wherein the network device is a switch element.

10. The network device of claim 8, wherein the port is configured to operate as an Ethernet port.

11. The network device of claim 8, wherein the port is configured to operate as a Fibre Channel over Ethernet port.

12. The network device of claim 8, wherein the network device is an adapter for sending and receiving information.

13. A network device for sending and receiving information, comprising:

a port coupled to a plurality of links and having a receive segment for receiving information and a transmit segment for transmitting information, wherein the receive segment comprises:

a dedicated forward error correction logic for receiving information at each of the plurality of links, when the port operates in a first configuration as a first independent port using only one link;

a multilane forward error correction logic configured for use when the port operates as a second independent port in a second configuration using more than one link that provides a combined throughput for the second configuration; and at least one multiplexer for selecting between the dedicated forward error correction logic and the multilane forward error correction logic; and wherein the transmit segment comprises:

a transmit segment dedicated forward error correction logic and a single lane phase first-in-first-out (FIFO) memory configured for use in the first configuration;

a transmit segment multilane forward error correction logic and multilane FIFO memory configured for use in the second configuration; and at least one multiplexer for selecting between the single lane phase FIFO memory and the multilane phase FIFO memory; and wherein in the first configuration the port operates at 25 gigabits per second using the one link and in the second configuration the port uses two links operating at a combined rate of 50 gigabits per second, or uses three links operating at a combined rate of 75 gigabits per second.

14. The network device of claim 13, wherein the network device is a switch element.

15. The network device of claim 13, wherein the network device is a switch element having the port.

16. The network device of claim 13, wherein the port is configured to operate as an Ethernet port.

17. The network device of claim 13, wherein the port is configured to operate as a Fibre Channel over Ethernet port.

18. The network device of claim 13, wherein the network device is an adapter for sending and receiving information.

* * * * *